United States Patent
Williams et al.

(10) Patent No.: US 10,047,894 B2
(45) Date of Patent: Aug. 14, 2018

(54) APPARATUS, SYSTEM, AND METHOD FOR TUBING CAPS

(71) Applicant: Cap-It, LLC, Mariott-Slaterville, UT (US)

(72) Inventors: Jason Williams, Farr West, UT (US); Travis Hess, Mariott-Slaterville, UT (US)

(73) Assignee: Cap-It, LLC, Marriot-Slaterville, UT (US)

(*) Notice: Subject to any disclaimer, the term of this patent is extended or adjusted under 35 U.S.C. 154(b) by 79 days.

(21) Appl. No.: 15/073,635

(22) Filed: Mar. 17, 2016

(65) Prior Publication Data
US 2017/0268712 A1    Sep. 21, 2017

(51) Int. Cl.
  *F16L 55/115*   (2006.01)
  *F16L 57/00*   (2006.01)
  *H02G 3/04*   (2006.01)

(52) U.S. Cl.
  CPC .......... *F16L 57/005* (2013.01); *H02G 3/0418* (2013.01)

(58) Field of Classification Search
  CPC ..................................................... F16B 37/14
  USPC ...... 138/96 R, 96 T, 89, 89.1–89.4; 411/377, 411/374, 429, 431
  See application file for complete search history.

(56) References Cited

U.S. PATENT DOCUMENTS

| | | | | |
|---|---|---|---|---|
| 969,905 | A * | 9/1910 | Reed | B65D 59/06 137/800 |
| 1,254,514 | A * | 1/1918 | Lehmann | F16B 37/14 138/89.4 |
| 4,400,123 | A * | 8/1983 | Dunegan | F16B 37/14 116/270 |
| 5,028,093 | A * | 7/1991 | Nason | B60B 7/00 301/37.374 |
| 6,808,350 | B1 * | 10/2004 | Tooman | F16B 37/14 411/372.5 |
| D579,761 | S * | 11/2008 | Tooman | D8/356 |
| D631,335 | S * | 1/2011 | Bruce, III | D8/387 |
| 8,002,508 | B2 * | 8/2011 | Reed | F16B 37/14 411/377 |
| 8,333,537 | B2 * | 12/2012 | Rogers | F16B 31/02 301/35.622 |
| 8,646,488 | B1 | 2/2014 | Shindelar | |
| 2008/0152459 | A1 * | 6/2008 | Tooman | F16B 37/14 411/372.5 |
| 2008/0314468 | A1 * | 12/2008 | Houghton | F16L 1/11 138/89 |
| 2011/0123293 | A1 * | 5/2011 | Matlock | F16B 37/14 411/429 |
| 2012/0321412 | A1 * | 12/2012 | Lonn | F16B 37/14 411/431 |

* cited by examiner

*Primary Examiner* — Patrick F Brinson
(74) *Attorney, Agent, or Firm* — Brown IP Law LC; Kerry Brown

(57) ABSTRACT

A cap for tubing. The cap includes a post and a socket. The post includes an exterior tube mating surface and a substantially flat top surface disposed at a first end of the post. The socket is disposed at a second end of the post. The socket includes an interior tube mating surface and a tool mating surface.

18 Claims, 6 Drawing Sheets

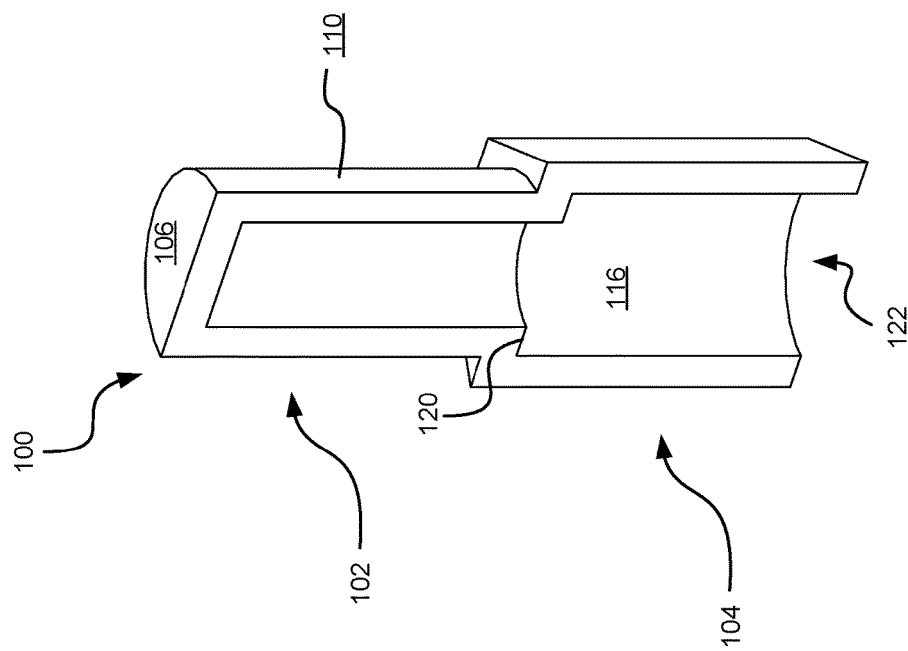
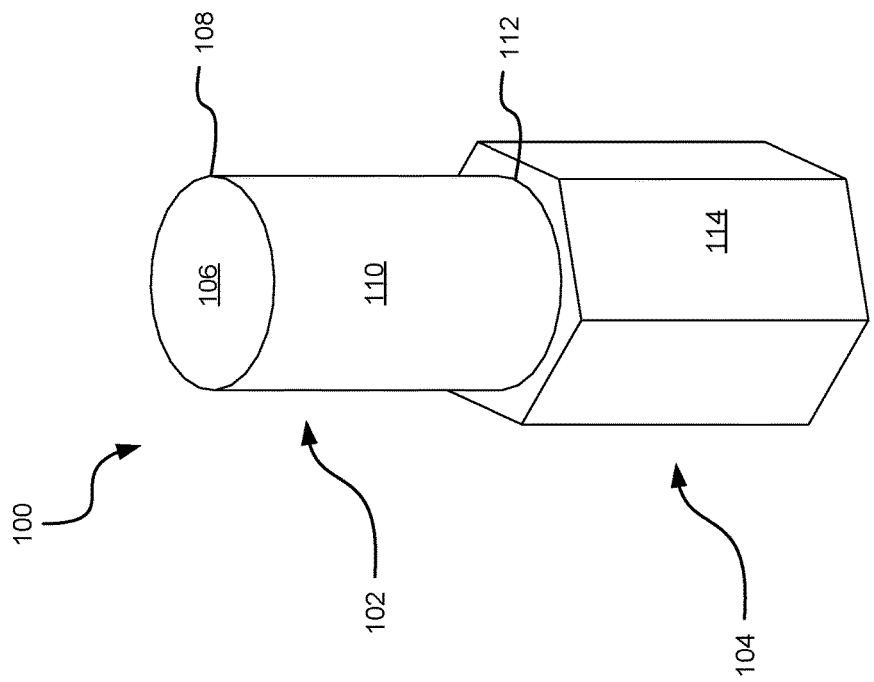

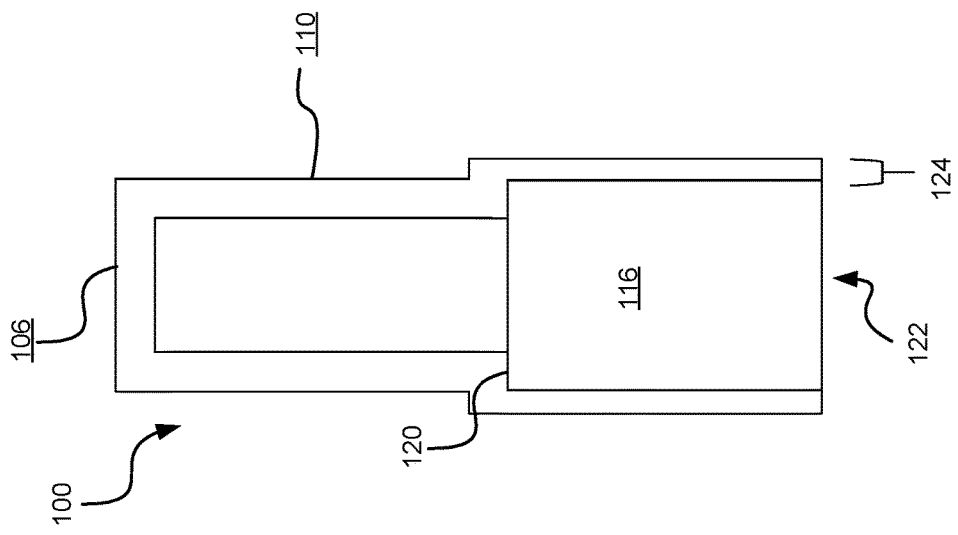
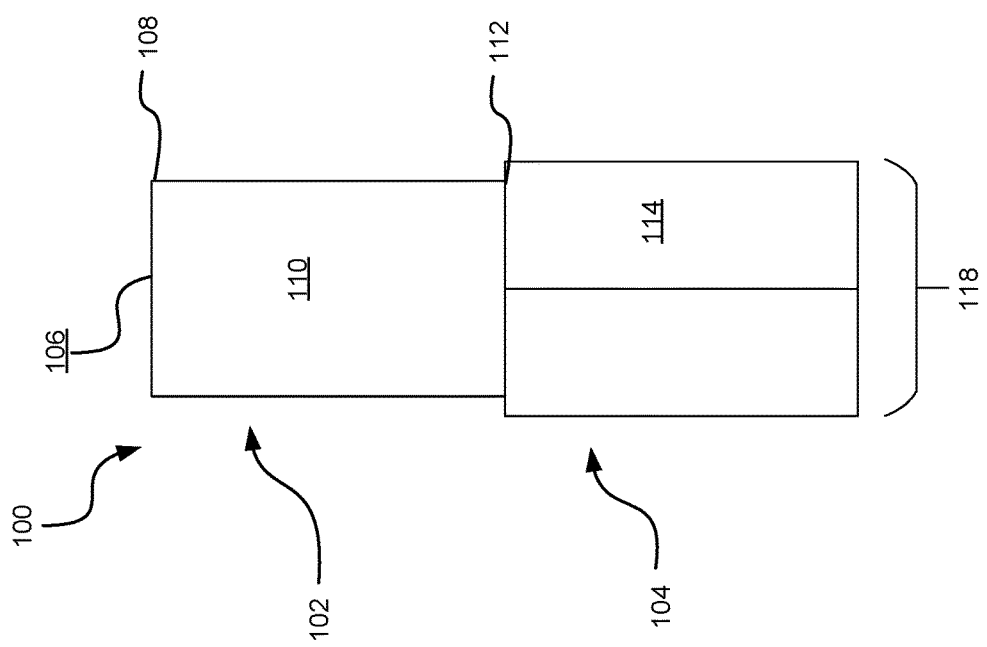

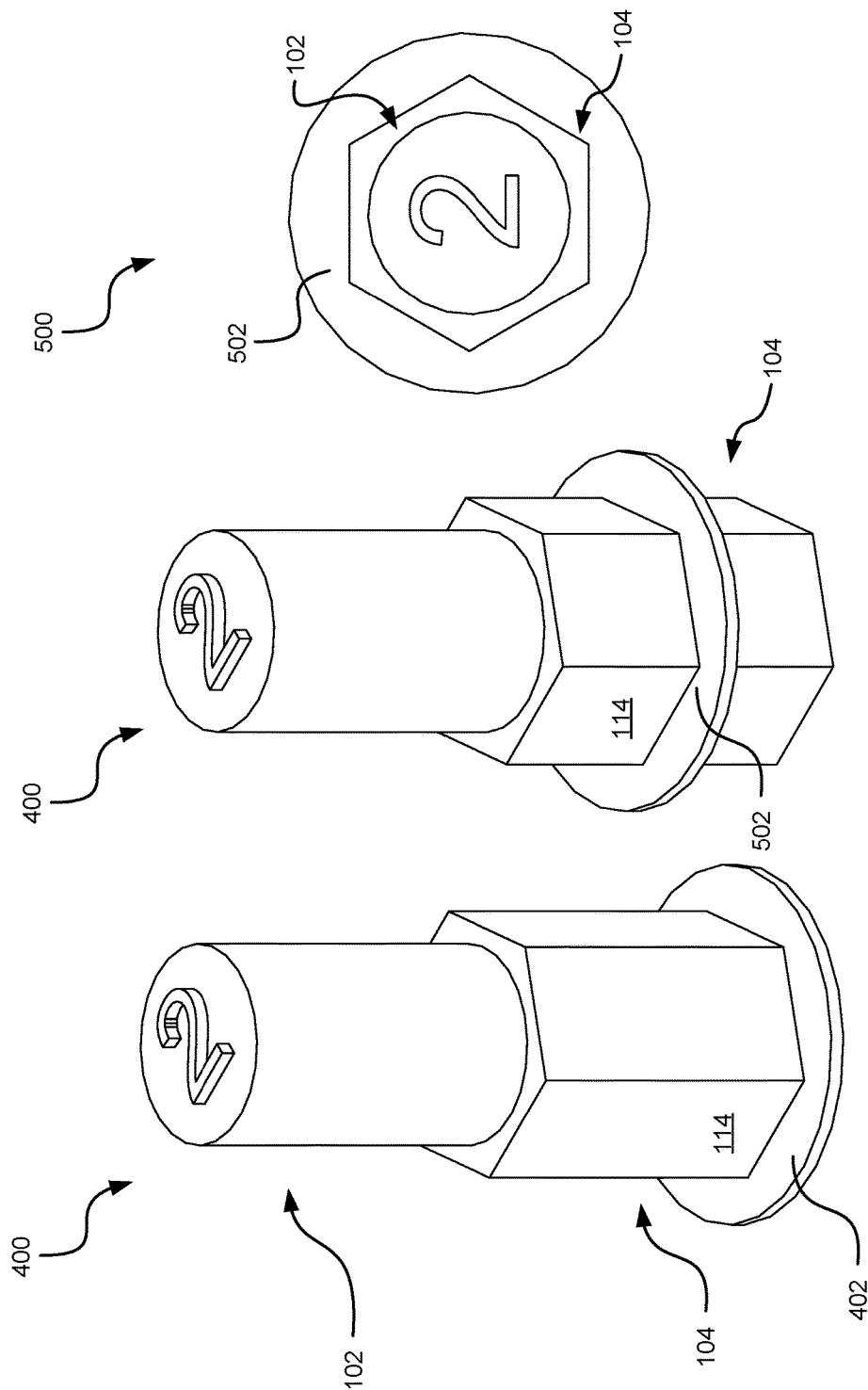

APPARATUS, SYSTEM, AND METHOD FOR TUBING CAPS

CROSS-REFERENCE TO RELATED APPLICATIONS

N/A

SUMMARY

An embodiment of the invention provides a cap for tubing. The cap includes a post and a socket. The post includes an exterior tube mating surface and a substantially flat top surface disposed at a first end of the post. The socket is disposed at a second end of the post. The socket includes an interior tube mating surface and a tool mating surface. Other embodiments of tubing caps are also described.

BRIEF DESCRIPTION OF THE SEVERAL VIEWS OF THE DRAWINGS

FIG. 1A depicts a perspective view of one embodiment of a cap.

FIG. 1B depicts a cutaway perspective view of the cap of FIG. 1A.

FIG. 1C depicts a side view of the cap of FIG. 1A.

FIG. 1D depicts a cutaway side view of the cap of FIG. 1A.

FIG. 4 depicts a perspective view of one embodiment of a cap with a spacer flange.

FIG. 5 depicts a perspective view of another embodiment of a cap with a spacer flange.

FIG. 6 depicts a top view of one embodiment of a cap with a spacer flange.

Throughout the description, similar reference numbers may be used to identify similar elements.

DETAILED DESCRIPTION

Figure 1F:
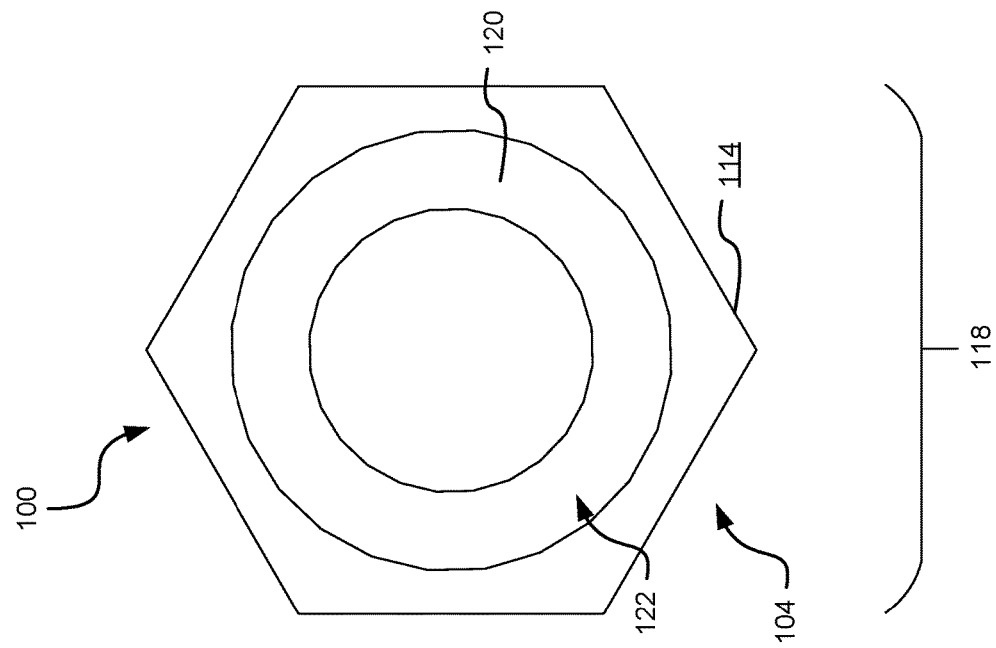
FIG. 1F depicts a bottom view of the cap of FIG. 1A.
Figure 1E:
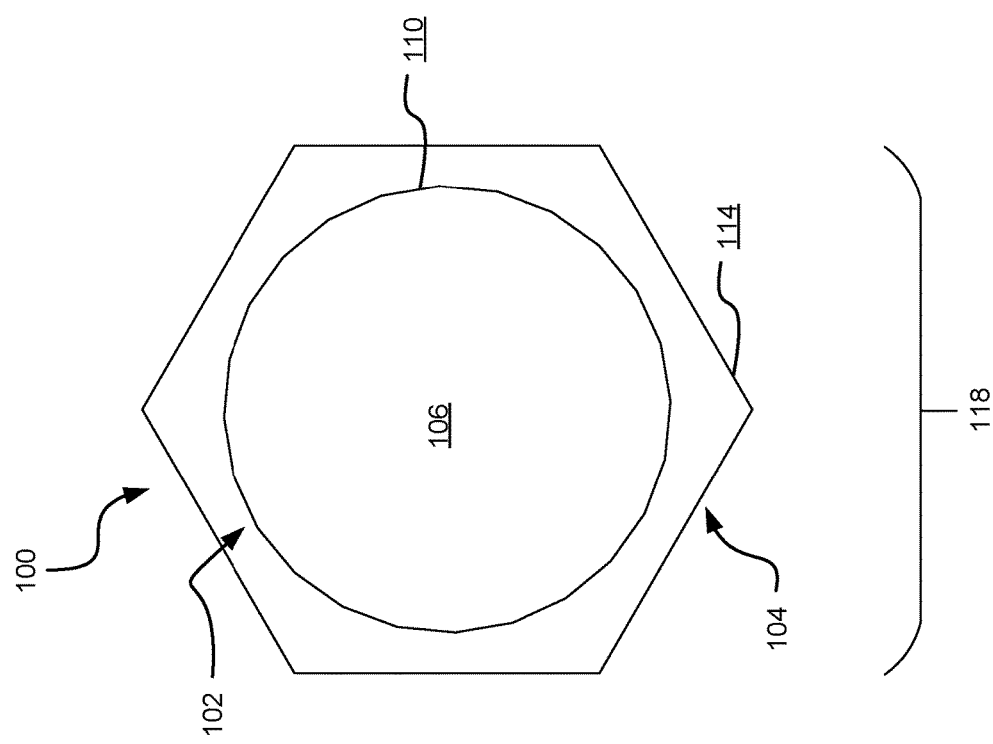
FIG. 1E depicts a top view of the cap of FIG. 1A.

In the following description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

While many embodiments are described herein, at least some of the described embodiments provide an apparatus for a cap configured to interface with tubing, such as conduit. The cap restricts entry of foreign matter into the conduit. In some embodiments, the cap provides identification of the conduit. The cap may also provide proper spacing between a plurality of conduits in certain embodiments.

FIGS. 1A-1F depict various views of one embodiment of a cap 100. The cap 100 is configured to interface with a tube (not shown) such as a conduit. The cap 100 includes a post 102 and a socket 104. The cap 100 is removably attachable to an end of a tube.

The post 102, in some embodiments, includes a substantially flat top surface 106 at a first end 108 of the post 102 and an exterior tube mating surface 110. The exterior tube mating surface 110 is disposed between the first end 108 and a second end 112 of the post 102.

The substantially flat top surface 106 helps prevent injury in the event that a worker falls onto or otherwise impacts the cap 100 when affixed to a tube. In some embodiments, the cap 100 includes a convex or concave top surface. As will be appreciated by one skilled in the art, the cap 100 may include a top surface with any shape. In some embodiments, the substantially flat top surface 106 covers an end of a tube when the cap 100 is installed on the tube.

In some embodiments, the exterior tube mating surface 110 is sized to be insertable into a tube to attach the cap 100 to the tube. In one embodiment, the exterior tube mating surface 110 is sized to be insertable into a bell end of a tube. For example, some conduit has a "bell end" on one end that is designed to receive a non bell end of the same sized conduit. The exterior tube mating surface 110 may have a diameter such that it is insertable into a bell end of such a conduit.

The exterior tube mating surface 110, in some embodiments, is configured to provide an interference fit with a predetermined size tube. For example, the cap 100 may be designed to interface with one inch polyvinyl chloride ("PVC") electrical conduit. The exterior tube mating surface 110 may have a substantially circular cross sectional area and be sized with a cross sectional diameter along at least a portion of the exterior tube mating surface 110 of approximately 1.315 inches, which is a standard exterior diameter of such conduit. The exterior tube mating surface 110 in this example may provide a friction fit in the bell end of one inch PVC conduit.

In some embodiments, the exterior tube mating surface 110 has a circular cross sectional shape. The exterior tube mating surface 110 may have a substantially constant diameter along the length of the post 102 from the first end 108 to the second end 112. In some embodiments, the exterior tube mating surface 110 has a substantially constant diameter for a portion of the post 102 between the first end 108 and the second end 112. In certain embodiments, the exterior tube mating surface 110 tapers such that the cross sectional radius increases along at least a portion of the exterior tube mating surface 110 between the first end 108 and the second end 112.

The socket 104, in one embodiment, includes a tool interface surface 114 and an interior tube mating surface 116. The socket 104 is removably attachable to a tube. In one embodiment, the socket 104 slides over the tube and interacts with the tube at the interior tube mating surface 116.

The tool interface surface 114, in some embodiments, provides an interface for a tool to manipulate the cap 100. The tool interface surface 114 may include one or more substantially flat surfaces. In one embodiment, the tool interface surface 114 includes a plurality of substantially flat surfaces. The plurality of substantially flat surfaces may be arranged into a surface with a geometric cross section, such as a hexagon. For example, the tool interface surface 114 may include six substantially flat surfaces arranged such that they form a hexagonal cross section.

In some embodiments, the tool interface surface 114 is sized to correspond to a standard sized tool. For example, in the example above, the hexagonal cross section may have a minimum width 118 sized to correspond to a standard sized wrench or socket. The tool interface surface 114 may interact with any type of suitable tool. For example, the tool interface surface 114 may interact with a socket, a box wrench, an open end wrench, a crescent wrench, an adjustable wrench, pliers, or any other type of tool. In one embodiment, the tool interface surface 114 may be manipulated using an electric driver or impact tool via a socket.

The cap 100, in some embodiments, may be manipulated via the tool interface surface 114. For example, the tool interface surface 114 may be gripped by a tool and twisted, thus twisting the cap 100. Twisting the cap may facilitate removal or installation of the cap 100 from or onto the tube, respectively.

The interior tube mating surface 116, in one embodiment, provides an interface for attaching the cap 100 to a tube. For example, the cap 100 may be designed to interface with one inch PVC electrical conduit. The interior tube mating surface 116 may have a substantially circular cross sectional area and be sized with a cross sectional diameter along at least a portion of the interior tube mating surface 116 slightly larger than 1.315 inches, which is a standard exterior diameter of such conduit. The interior tube mating surface 116 in this example may provide a friction fit in the non-bell end of one inch PVC conduit. In some embodiments, the interior tube mating surface 116 provides an interference fit with a particular sized tube.

In some embodiments, the interior tube mating surface 116 has a circular cross sectional shape. The interior tube mating surface 116 may have a substantially constant diameter along the length of the socket 104 between a stop 120 and an opening 122. In some embodiments, the interior tube mating surface 116 has a substantially constant diameter for a portion of the socket 104 between the stop 120 and the opening 122. In certain embodiments, the interior tube mating surface 116 tapers such that the cross sectional radius increases along at least a portion of the interior tube mating surface 116 between the stop 120 and the opening 122.

The stop 120, in some embodiments, is a structure that limits insertion of a tube to a predetermined depth. In one embodiment, the stop 120 is a shoulder that obstructs tubes of a diameter sufficiently small to be inserted into the socket 104, but too large to pass the shoulder. In another embodiment, the stop 120 is a surface that forms an interior end of the socket 104 opposing the opening 122 of the socket 122.

The opening 122 of the socket 104, in certain embodiments, provides a channel for tubing to be inserted into the socket 104. In some embodiments, the opening 122 has a profile similar to or formed by the interior tube mating surface 116.

In one embodiment, the socket 104 has a wall thickness 124 between the tool interface surface 114 and the interior tube interface surface 116. The wall thickness 124 may be sized such that the socket 104 has sufficient strength and rigidity to be manipulated by a tool.

In some embodiments, the wall thickness 124 is sized to space the cap 100 with an engaged tube from one or more adjacent tubes. For example, it may be desirable to have a ¼ inch space between two or more conduits clustered together. In this example, the wall thickness 124 may be a minimum of ¼ inch to ensure that an engaged conduit is spaced at least ¼ inch from an adjacent conduit.

The cap 100 may be made from any material sufficiently strong and rigid to perform the functions of the cap 100. For example, the cap 100 may include plastics, metals, or composite materials. In one embodiment, the cap 100 includes PVC material. In another embodiment, the cap 100 includes glass-filled nylon. In yet another embodiment, the cap 100 includes stainless steel. The cap 100 may include any material known in the art, including polymers, alloys, natural materials, synthetic materials, or combinations of materials. Examples of materials that may be included in the cap 100 include PVC, acrylonitrile butadiene styrene (ABS), nylon, polylactic acid (PLA), polycarbonate (PC), polyeter sulfone (PES), polyetherether ketone (PEEK), polyetherimide (PEI), polyethylene (PE), polyphenylene oxide (PPO), polyphenylene sulfide (PPS), polypropylene (PP), polystyrene, polyurethane, phenol-formaldehyde, melamine, diallyl-phthalate (DAP), epoxy, polyimides, cyanates, vulcanized rubber, steel, aluminum, carbon fiber, glass fiber, or the like.

Figure 2:
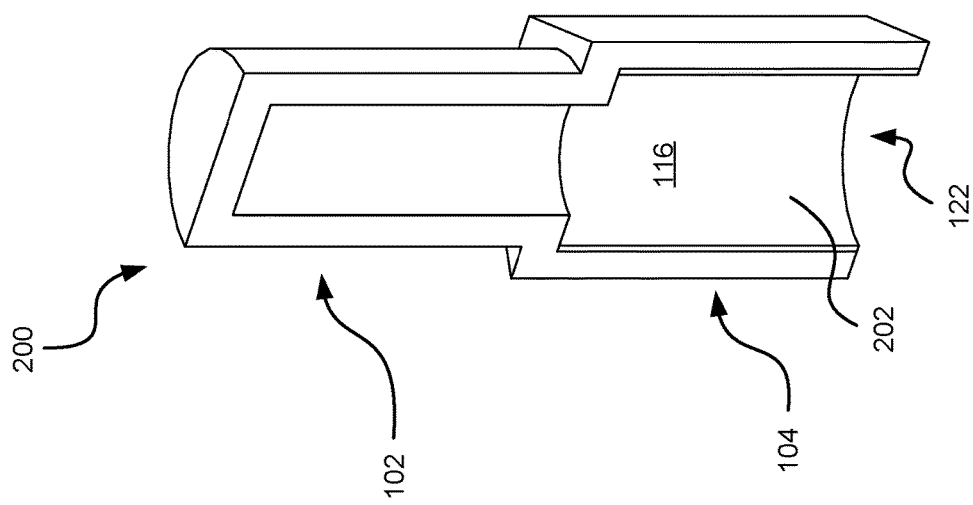
FIG. 2 depicts a cutaway perspective view of one embodiment of a cap with a friction enhancing component.

FIG. 2 depicts a cutaway perspective view of one embodiment of a cap 200 with a friction enhancing component 202. The cap 200 includes a post 102, and a socket 104 with an interior tube mating surface 116. The cap 200 is removably attachable to a tube at an interior tube mating surface 116.

The post 102 and the socket 104, in some embodiments, are similar to like-numbered components described above. The interior tube mating surface 116, in one embodiment, includes the friction enhancing component 202. In some embodiments, the friction enhancing component 202 includes a sleeve of a relatively high friction material to improve the connection between the tube and the cap 100. For example, the cap 200 may be made substantially from steel, and the friction enhancing component 202 may be a sleeve of synthetic rubber.

Figure 3:
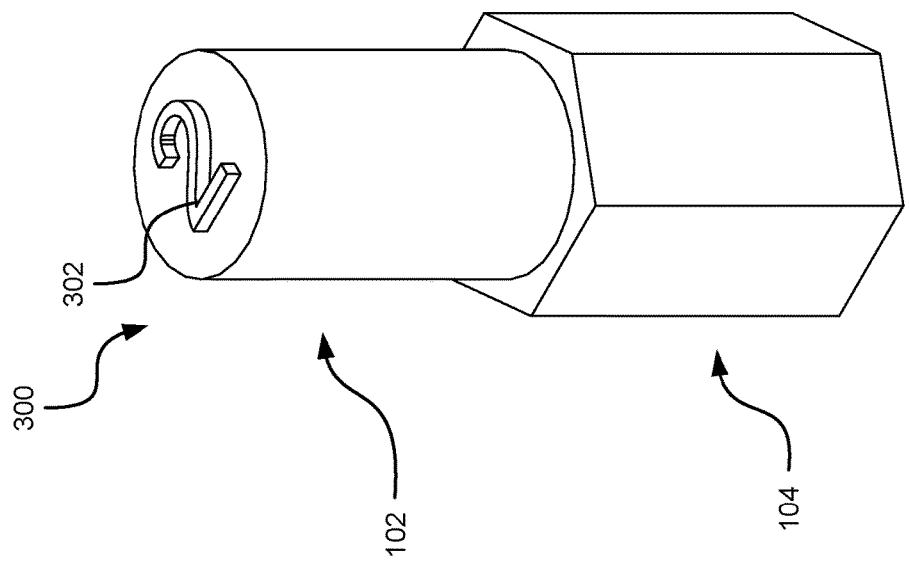
FIG. 3 depicts a perspective view of one embodiment of a cap with an identifier.

FIG. 3 depicts a perspective view of one embodiment of a cap 300 with an identifier 302. The cap includes a post 102 and a socket 104. The cap 300 is removably attachable to a tube.

The post 102 and the socket 104, in some embodiments, are similar to like-numbered components described above. The identifier 302 provides identification of the cap 300 and an inference to identify an attached tube. For example, a particular piece of electrical conduit may be designated for transmitting a particular wire or wire with a particular function from a first location to a second location, the first and second locations at opposite ends of the conduit when installed. A particular identifier associated with the cap 300 may be associated with the conduit and installed at one or both ends of the conduit to aid in later identification of the conduit. For example, two caps labeled "2" may be placed on each end of the conduit to be so identified. Caps with different labels (e.g. "5," "A," "Trunk," etc.) may be attached to other conduits.

The identifier 302 may be any type of identifier that can differentiate the cap 300 from other caps. In the illustrated example, the identifier 302 is a visible, alphanumeric character located on the cap 300. Visible identifiers 302 may be located at any position on the cap 300 and may be located in multiple positions. For example, the identifier may be located on both the post 102 and on the socket 104. A visible identifier may be a label attached to the cap 300, may be printed onto the cap 300, or may be formed into the cap 300, such as by molding, stamping, engraving, or forming.

In one embodiment, the identifier includes one or more different colors of caps 300 or portions of caps. For example, a red cap may be associated with a particular purpose and a blue cap may be associated with another purpose.

In some embodiments, the identifier 302 is a code readable by a machine. For example, the identifier may include a bar code or a radio-frequency identification (RFID) tag. The identifier may be readable by a machine, such as a smartphone or scanner. The machine may be able to associate the identifier with a particular conduit or intended use of the conduit.

For example, the cap 300 may include a near field communication tag (NFC tag) readable by a smartphone. The NFC tag may identify a particular cap 300 and/or make the cap distinguishable from other caps. A user may scan the NFC tag using a smartphone and indicate that the cap 300 associated with the NFC tag is attached to a conduit with a particular purpose. Subsequent scans of the NFC tag may result in an indication on the scanning device that the attached conduit is intended for the specified purpose.

FIG. 4 depicts a perspective view of one embodiment of a cap 400 with a spacer flange 402. The cap 400 includes a post 102 and a socket 104. The cap 500 is removably attachable to a tube.

The post 102 and the socket 104, in some embodiments, are similar to like-numbered components described above. The spacer flange 402, in one embodiment, is attached to the cap 400 and configured to maintain a particular minimum amount of spacing between an attached tube and an adjacent tube. For example, it may be desirable to have a 1 inch space between two or more conduits clustered together. In this example, the spacer flange 402 may have a circular cross section with a radius approximately one inch larger than that of an associated conduit to ensure that an engaged conduit is spaced at least 1 inch from an adjacent conduit.

In some embodiments, the spacer flange 402 improves the functionality of the tool interface surface 114. The spacer flange 402 may provide a stop that retains a tool engaged with the tool interface surface 114. For example, a user may press a wrench against the spacer flange 402 while the wrench is engaged with the tool interface surface 114. The spacer flange 402, in this example, may prevent the wrench from slipping off the tool interface surface 114.

FIGS. 5 and 6 depict a perspective view and a top view, respectively, of another embodiment of a cap 500 with a spacer flange 502. The cap 500 includes a post 102 and a socket 104. The cap 500 is removably attachable to a tube.

The post 102 and the socket 104, in some embodiments, are similar to like-numbered components described above. The spacer flange 502 is similar to the spacer flange 402 described above. The spacer flange 502 may be disposed in any location along the long axis of the cap 500. In one embodiment, the spacer flange 402 is disposed near an opening of the socket 104, as illustrated in FIG. 4. In an alternative embodiment, the spacer flange 502 is located at a position on the socket 104 other than near the opening of the socket 104. In the embodiment illustrated in FIG. 5, the spacer flange 502 is located at approximately the middle of the socket 104.

Figure 7:
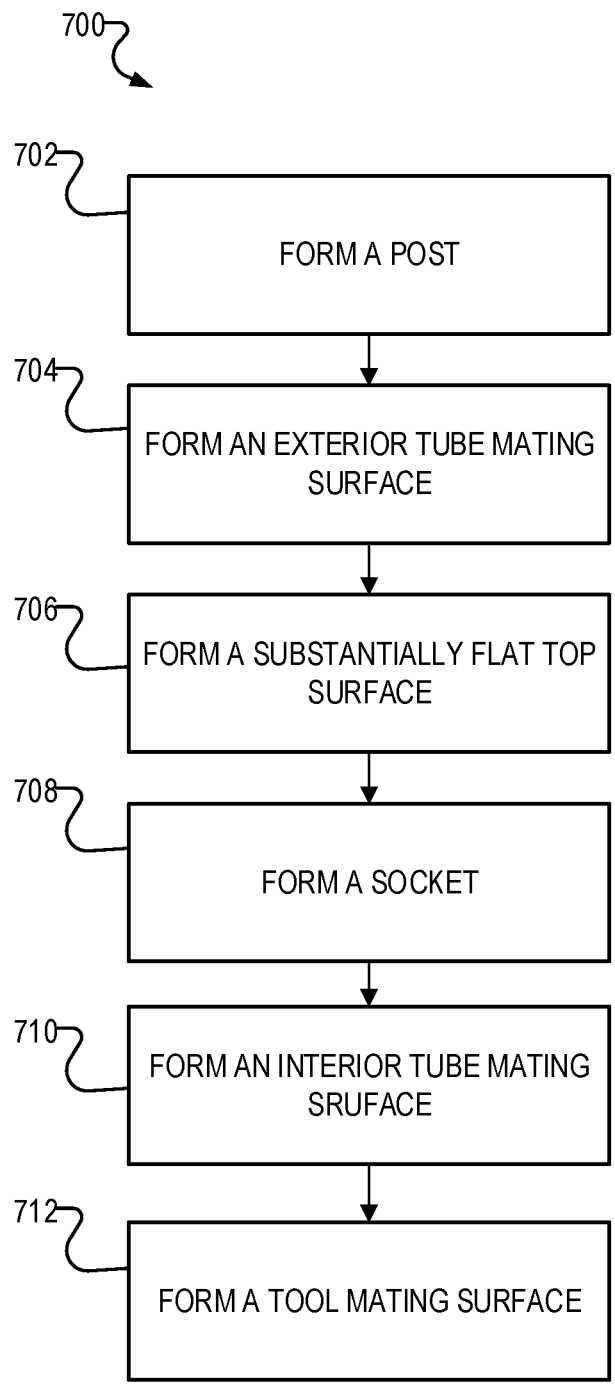
FIG. 7 illustrates one embodiment of a method for manufacturing a cap.

FIG. 7 depicts a flowchart diagram showing an embodiment of a method for manufacturing tubing caps. The method is, in certain embodiments, a method of use of the system and apparatus of FIGS. 1-6, and will be discussed with reference to those figures. Nevertheless, the method may also be conducted independently thereof and are not intended to be limited specifically to the specific embodiments discussed above with respect to those figures.

FIG. 7 illustrates a method 700 for manufacturing a cap 100. As shown in FIG. 7, a post 102 is formed 702, an exterior tube mating surface 104 is formed 704, and a substantially flat top surface 106 is formed 706. A socket 104 is formed 708, an interior tube mating surface 116 is formed 710 and a tool mating surface 114 is formed 712. Components described in this method 700 may be formed separately and later connected or formed simultaneously. Components may be formed as a unified whole or in separate, connectable parts. The cap 100 may be formed using any method known in the art, including molding (including injection molding, blow molding, compression molding, extrusion molding, matrix molding, rotational molding, spin casting, thermoforming, or the like), casting, pressing, extrusion deposition, lamination, photopolymerization, metal wire processes, or any other known method.

The components described herein may include any materials capable of performing the functions described. Said materials may include, but are not limited to, steel, stainless steel, titanium, tool steel, aluminum, polymers, and composite materials. The materials may also include alloys or combinations of any of the above materials. The materials may undergo any known treatment process to enhance one or more characteristics, including but not limited to heat treatment, hardening, forging, annealing, and anodizing. Materials may be formed or adapted to act as any described components using any known process, including but not limited to casting, extruding, injection molding, machining, milling, forming, stamping, pressing, drawing, spinning, deposition, winding, molding, and compression molding.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by any claims appended hereto and their equivalents.

What is claimed is:

1. A cap for tubing comprising:
    a post comprising:
        an exterior tube mating surface; and
        a substantially flat top surface disposed at a first end of the post; and
    a socket disposed at a second end of the post, the socket comprising:
        an interior tube mating surface comprising a substantially round cross section; and
        a tool mating surface.

2. The cap of claim 1, wherein the tool mating surface comprises one or more substantially flat surfaces configured to interface with a wrench.

3. The cap of claim 2, wherein the one or more substantially flat surfaces comprise six substantially flat surfaces configured to have a hexagonal cross-section.

4. The cap of claim 2, wherein the one or more substantially flat surfaces are configured to interface with a wrench selected from the group consisting of a socket wrench, an open end wrench, and a box end wrench.

5. The cap of claim 1, wherein the exterior tube mating surface is disposed between the first end of the post and the second end of the post.

6. The cap of claim 1, wherein the exterior tube mating surface has a substantially round cross section.

7. The cap of claim 6, wherein a diameter of the substantially round cross-section is substantially constant at a plurality of locations between the first end of the post and the second end of the post.

8. The cap of claim 6, wherein a diameter of the substantially round cross-section increases along at least a portion of the exterior tube mating surface between the first end of the post and the second end of the post.

9. The cap of claim 1, wherein a diameter of the substantially round cross-section of the interior tube mating surface is substantially constant at a plurality of locations between an opening at a first end of the socket and a stop at an opposing end of the socket.

10. The cap of claim 1, wherein a diameter of the substantially round cross-section of the interior tube mating surface decreases along at least a portion of the interior tube mating surface between an opening at a first end of the socket and a stop at an opposing end of the socket.

11. The cap of claim 1, further comprising a spacer disposed on the socket.

12. The cap of claim 11, wherein the spacer comprises a flange having a round cross section.

13. The cap of claim 11, wherein the spacer is disposed between an opening of the socket and the second end of the post.

14. A cap for tubing comprising:
   a post comprising:
      an exterior tube mating surface; and
      a substantially flat top surface disposed at a first end of the post;
   a socket disposed at a second end of the post, the socket comprising:
      an interior tube mating surface comprising a substantially round cross section; and
      a tool mating surface; and
   an identifier disposed on the cap.

15. The cap of claim 14, wherein the identifier comprises a plurality of alphanumeric characters.

16. The cap of claim 14, wherein the identifier comprises a single alphanumeric character.

17. The cap of claim 14, wherein the identifier comprises a machine identifiable code.

18. A method of manufacturing a cap for tubing comprising
   forming a post and a socket, the post comprising:
      an exterior tube mating surface; and
      a substantially flat top surface disposed at a first end of the post; and
   the socket comprising:
      an interior tube mating surface comprising a substantially round cross section; and
      a tool mating surface.

\* \* \* \* \*